(12) United States Patent
Cambruzzi et al.

(10) Patent No.: US 11,186,464 B2
(45) Date of Patent: Nov. 30, 2021

(54) METHOD FOR FIXING A RAIL BRACKET OF AN ELEVATOR SYSTEM, AND ELEVATOR SYSTEM

(71) Applicant: Inventio AG, Hergiswil (CH)

(72) Inventors: Andrea Cambruzzi, Zürich (CH); Christian Studer, Kriens (CH); Philipp Zimmerli, Harkingen (CH); Raphael Bitzi, Lucerne (CH); Erich Bütler, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 216 days.

(21) Appl. No.: 16/478,160

(22) PCT Filed: Feb. 1, 2018

(86) PCT No.: PCT/EP2018/052487
§ 371 (c)(1),
(2) Date: Jul. 16, 2019

(87) PCT Pub. No.: WO2018/145984
PCT Pub. Date: Aug. 16, 2018

(65) Prior Publication Data
US 2019/0367328 A1    Dec. 5, 2019

(30) Foreign Application Priority Data
Feb. 8, 2017    (EP) .................................. 17155105

(51) Int. Cl.
*B66B 7/02*    (2006.01)
*B32B 38/00*    (2006.01)
(Continued)

(52) U.S. Cl.
CPC .............. *B66B 7/024* (2013.01); *B32B 37/00* (2013.01); *B32B 37/12* (2013.01); *B32B 38/0012* (2013.01); *B32B 2309/105* (2013.01); *B32B 2311/30* (2013.01); *B32B 2315/06* (2013.01); *B66B 19/002* (2013.01)

(58) Field of Classification Search
None
See application file for complete search history.

(56) References Cited

U.S. PATENT DOCUMENTS

| 9,388,019 B2 | 7/2016 | Carparelli et al. |
| 2007/0181382 A1* | 8/2007 | Sittler ................ B66B 11/0253 |
| | | 187/401 |

(Continued)

FOREIGN PATENT DOCUMENTS

| CN | 201971520 U | 9/2011 |
| CN | 102686498 A | 9/2012 |

(Continued)

*Primary Examiner* — Barbara J Musser
(74) *Attorney, Agent, or Firm* — William J. Clemens; Shumaker, Loop & Kendrick, LLP

(57) ABSTRACT

A method for fixing a rail bracket for mounting a guide rail on a shaft wall of an elevator shaft of an elevator system includes applying an adhesive layer between a support surface of the rail bracket and a final fixing region of the shaft wall in the fixed state of the rail bracket. The rail bracket is thus adhered to the shaft wall, and the rail bracket can also be additionally fixed to the shaft wall by at least one fixing element such as a nail.

14 Claims, 3 Drawing Sheets

(51) Int. Cl.
*B32B 37/00* (2006.01)
*B32B 37/12* (2006.01)
*B66B 19/00* (2006.01)

(56) References Cited

U.S. PATENT DOCUMENTS

| | | | |
|---|---|---|---|
| 2012/0308744 A1* | 12/2012 | Depres | D21H 27/004 428/32.2 |
| 2015/0082737 A1* | 3/2015 | Brady | E04G 23/0222 52/698 |
| 2016/0311659 A1* | 10/2016 | Mertala | B66B 19/002 |
| 2017/0170158 A1* | 6/2017 | Koopmans | H01L 22/14 |
| 2018/0185964 A1* | 7/2018 | Yokoi | C09J 7/20 |

FOREIGN PATENT DOCUMENTS

| | | |
|---|---|---|
| JP | H01117190 A | 5/1989 |
| JP | H01133883 A | 5/1989 |
| JP | H10250957 A | 9/1998 |
| JP | H11141271 A | 5/1999 |
| WO | 9015009 A1 | 12/1990 |
| WO | 2017016783 A | 2/2017 |

* cited by examiner

METHOD FOR FIXING A RAIL BRACKET OF AN ELEVATOR SYSTEM, AND ELEVATOR SYSTEM

FIELD

The invention relates to a method for fixing a rail bracket for mounting a guide rail on an elevator shaft wall of an elevator system and an elevator system having an elevator shaft and a guide rail fixed to a wall of the elevator shaft by a rail bracket.

BACKGROUND

WO 90/15009 A1 describes a method for fixing a rail bracket for mounting a guide rail to a shaft wall of an elevator shaft of an elevator system. The rail bracket consists of a rail bracket bottom part and a rail bracket top part, which are connected to each other by means of screws. The rail bracket bottom part is fixed by means of two fastening elements such as screws, screw anchors or screw bolts to the shaft wall, which usually is made of concrete. This requires in particular fastening elements having a diameter of at least 10 mm, for which holes having a corresponding diameter must be drilled in the shaft wall. This is very time-consuming and creates a lot of noise and dirt, particularly drilling dust. Fixing the rail brackets by an assembler is also very physically exhausting. In the case of fixing the rail brackets by means of a mechatronic installation component, for example an industrial robot, the latter must brace very high forces when drilling holes in concrete and must not be damaged by the vibrations and impacts occurring during the drilling. This requires a very robust and thereby heavy and also expensive design of the installation component. Furthermore, the drilling of the holes is made even more difficult by reinforcements such as metal bars or grids in the concrete of the shaft wall.

JPH01133883A and JPH01133883A describe methods for fixing a guide rail of an elevator system to a shaft wall of an elevator shaft. The guide rails are fixed to the shaft wall by means of a rail bracket, which is made of a rail bracket bottom part and a rail bracket top part. For this purpose, the rail bracket bottom part is screwed to the shaft wall and the two rail bracket parts are connected by means of a screw-and-nut connection. In order to prevent the rail bracket bottom part from shifting in relation to the rail bracket top part, an adhesive layer is applied between the rail bracket bottom part and the rail bracket top part; thereby the two rail bracket parts are adhered to each other. The adhesive layer thereby reinforces the screw-and-nut connection between the two rail bracket parts; but it has no effect on the screwing of the rail bracket bottom part to the shaft wall.

SUMMARY

However, it is in particular an object of the invention to submit a method for fixing a rail bracket for mounting a guide rail on a shaft wall of an elevator shaft of an elevator system and an elevator system in which fixing the rail bracket to the shaft wall is particularly easy.

In the method for fixing a rail bracket for mounting a guide rail to a shaft wall of an elevator shaft of an elevator system according to the invention, an adhesive layer is applied which, in a fixed state of the rail bracket, is arranged between a support surface of the rail bracket and a final fixing region of the shaft wall. The rail bracket is therefore adhered to the shaft wall, wherein it can also be additionally fixed to the shaft wall by at least one fastening element. Thereby, no holes or at most only holes having a small diameter and depth have to be drilled into the shaft wall. Thereby, during the fixing of the rail bracket, there is no or very little drilling dust and noise. In addition, an assembler's level of physical strain is very low. A mechatronic installation component, which assembles rail brackets to the shaft wall, does not need to be constructed to absorb high forces, vibrations and impacts, making it comparatively lightweight and cost effective.

The rail bracket has in particular a rail bracket bottom part and a rail bracket top part, which are connected to each other by means of screws, wherein the rail bracket bottom part is fixed to the shaft wall. The connection, in particular the screwing, is designed in a way that the two rail bracket parts can be connected relative to each other in different alignments. Due to the different alignments of the two rail bracket parts mentioned above, the alignment of the guide rail secured to the rail bracket top part is made possible. The designations rail bracket bottom part and rail bracket top part are not intended to express any orientation between the two parts. The designations are only intended to ensure a clear distinction between the two parts. The rail bracket can also be designed in one piece. In the present application, a rail bracket is thereby understood as either a rail bracket bottom part or a complete rail bracket, which may be made of one or more parts. The rail bracket, or the rail bracket bottom part and the rail bracket top part, are made in particular of metal, for example sheet steel.

The guide rails, which are fixed to rail brackets and thereby to the shaft wall, run in a vertical direction in the elevator shaft and serve in the known manner to guide an elevator car and a counterweight during the operation of the elevator system.

The adhesive used for the adhesive layer can, for example, be a thixotropic, 2-component adhesive based on epoxy resin. In particular, the adhesive layer is several millimeters thick, for example between 2 and 15 mm. Between the adhesive layer and the shaft wall and/or the rail bracket there may be an additional layer, for example an adherent layer.

The support surface of the rail bracket is defined as the surface of the rail bracket that is mainly parallel to the shaft wall in the fixed state. The rail bracket abuts the shaft wall at least over a part of the support surface, the adhesive layer and if necessary the mentioned additional layers. The surface of the shaft wall corresponding to the support surface of the rail bracket in the fixed state of the rail bracket is referred to as the final fixing region of the shaft wall. The support surface of the rail bracket and the final fixing region of the shaft wall are in particular mainly rectangular, with dimensions of 150-400 mm×50-150 mm, for example.

The adhesive layer can extend over the entire support surface of the rail bracket or only over one or a plurality of regions of the support surface. In particular, the adhesive can be applied to two regions of approximately equal size which, in the fixed state of the rail bracket, are arranged as far out as possible in the horizontal direction on the support surface of the rail bracket. For example, the total surface of the region or regions in which adhesive is applied is greater than 1,600 $mm^2$, in particular greater than 2,000 $mm^2$.

The adhesive used to create the adhesive layer can be applied to either the support surface of the rail bracket or the final fixing region of the shaft wall, or both.

In the embodiment of the invention, a planned fixing region of the shaft wall is checked and the planned fixing region is only selected as the final fixing region if a specified test requirement is fulfilled. In particular, the test requirement is selected in such a way that it can be assumed that the rail bracket can be securely fixed to the final fixing region if the test requirement is fulfilled. Thereby, it is ensured that the rail bracket can be securely fixed to the shaft wall.

The planned fixing region of the shaft wall is understood to be the region where the rail bracket is to be fixed according to a work instruction or a construction plan.

In order to allow a secure fixing of the rail bracket by means of an adhesive, the final fixing region must be as even or flat as possible and must not have too large projections, landings, holes or recesses. The planned fixing region can be checked by means of a scanner, for example, in particular a laser scanner or a camera having appropriate image processing.

During the check, in particular the expanse of the shaft wall in a vertical direction (the main extension direction of the shaft wall), i.e. in particular the surface contour in a horizontal direction, is checked. The specified test requirement is fulfilled in particular if a maximum difference of the mentioned extension of the shaft wall, i.e. the distance between the highest elevation and the deepest indentation of the shaft wall in the extension direction is smaller than a limit value. The maximum difference is thus the maximum and minimum extension of the shaft wall surface in the mentioned direction. It is possible that smaller holes, for example up to a diameter of 3-5 mm, are not considered in the mentioned test. The limit value, which the mentioned maximum difference of the extension of the shaft wall surface may not exceed, is, for example, 1 to 3 mm.

In the embodiment of the invention a thickness of the applied adhesive layer depends on the result of the check of the planned fixing region of the shaft wall. In particular, the greater the determined unevenness of the final fixing region, the greater the thickness. The adhesive layer can thereby, to a certain extent, compensate for the unevenness of the final fixing region and a secure fixing of the rail bracket can be guaranteed. Due to the mentioned dependence of the thickness of the applied adhesive layer on the result of the check of the planned fixing region, a thicker adhesive layer is only applied if this is really necessary. Thereby, a secure fixing and at the same time a low consumption of adhesive is made possible and finally a secure and cost-optimized fixing of the rail brackets.

In the embodiment of the invention, the planned fixing region is adapted in the case in which the specified test requirement is not fulfilled. Thereby, it is very likely that a rail bracket can be fixed to the shaft wall at a position necessary for an additional assembling of the elevator system.

By an adjustment of the final fixing region it is understood that its position at the shaft wall is shifted. Thereby, a possible fixing region on the shaft wall is quasi sought. This is particularly possible with two-part rail brackets, as the flexible alignment of the rail bracket top part to the rail bracket bottom part described above gives a certain flexibility in the position of the rail bracket bottom part on the shaft wall. Additionally or alternatively to the shifting of the fixing region also its shape, thus its dimensions can be adjusted. This can be made possible in particular by the fact that different types of rail brackets having different support surfaces can be used.

In the embodiment of the invention, a new test is performed if the adjusted planned fixing region exceeds the originally planned fixing region. Thereby, it is guaranteed that the rail bracket can be securely fixed in the adjusted fixing region.

In the embodiment of the invention, the final fixing region is pretreated before the rail bracket is arranged. Thereby, a secure fixing of the rail bracket can be made possible.

The pre-treatment may involve, for example, removing smaller projections, for example by using a drill chisel, roughening the fixing region, for example by means of a rotating (steel) brush or an angle grinder, and/or applying an additional layer, for example an adherent layer.

Alternatively or additionally, the final fixing region can be cleaned. This can be done by means of compressed air, suction or water. Additionally, the support surface of the rail bracket can also be cleaned, in particular to remove adherent particles and/or for degreasing.

If a plurality of rail brackets is to be fixed to the shaft wall in an elevator shaft, then in particular all final fixing regions in the shaft are roughened first, then all final fixing regions in the elevator shaft are cleaned and then all rail brackets are fixed to the shaft walls of the elevator shaft. This approach has the advantage that any dirt produced during roughening cannot contaminate already cleaned fixing regions. In particular, roughening and especially cleaning in the elevator shaft is performed from top to bottom. Thereby, the danger is very low that already cleaned fixing regions will get dirty again by additional cleaning of fixing regions.

In the embodiment of the invention, the rail bracket is additionally fixed to the shaft wall by means of a fastening element. Thereby, a particularly secure fixing of the rail bracket is made possible.

The at least one fastening element can be designed as a screw, a screw anchor, a screw bolt or a nail. For example, the main purpose of the fastening element can be to hold the rail bracket in its desired position during the necessary hardening. Furthermore, the fastening element can apply an additional holding force, which is supported in particular below the surface of the shaft wall. The fastening element required for this is always smaller than a fastening element that would be required for fixing the rail bracket without an adhesive layer between the rail bracket and the shaft wall. Thereby, the effort for the insertion of the fastening element is much easier.

In the embodiment of the invention, the rail bracket is fixed to the shaft wall by means of a mechatronic installation component. A particularly simple and fast execution of the method is enabled thereby. The mechatronic installation component is in particular part of an assembly device and is held by a carrier component of the assembly device. The carrier component is configured to be displaced relative to the elevator shaft, i.e. within the elevator shaft for example, and positioned at different heights within the elevator shaft. The installation component is configured to perform at least one assembly step, for example fixing the rail brackets to the shaft wall during an installation process of the elevator system, at least semi-automatically, preferably fully automatically. The assembly device with the carrier component and the mechatronic installation component, for example, is designed according to the assembly device described in WO 2017/016783 A1.

The object mentioned above is also solved by an elevator system having an elevator shaft and a guide rail fixed to a shaft wall of the elevator shaft by means of a rail bracket. According to the invention, in a fixed state of the rail bracket, an adhesive layer is arranged between a support surface of the rail bracket and a final fixing region of the shaft wall. This enables a particularly simple and cost-effective fixing of the rail bracket to the shaft wall.

In particular, the rail bracket is additionally fixed to the shaft wall by means of a fastening element. This enables a particularly secure fixing of the rail bracket to the shaft wall.

Additional advantages, features, and details of the invention result using the following description of exemplary embodiments and using drawings in which the same or functionally identical elements are provided having identical reference signs.

DETAILED DESCRIPTION

Figure 1:
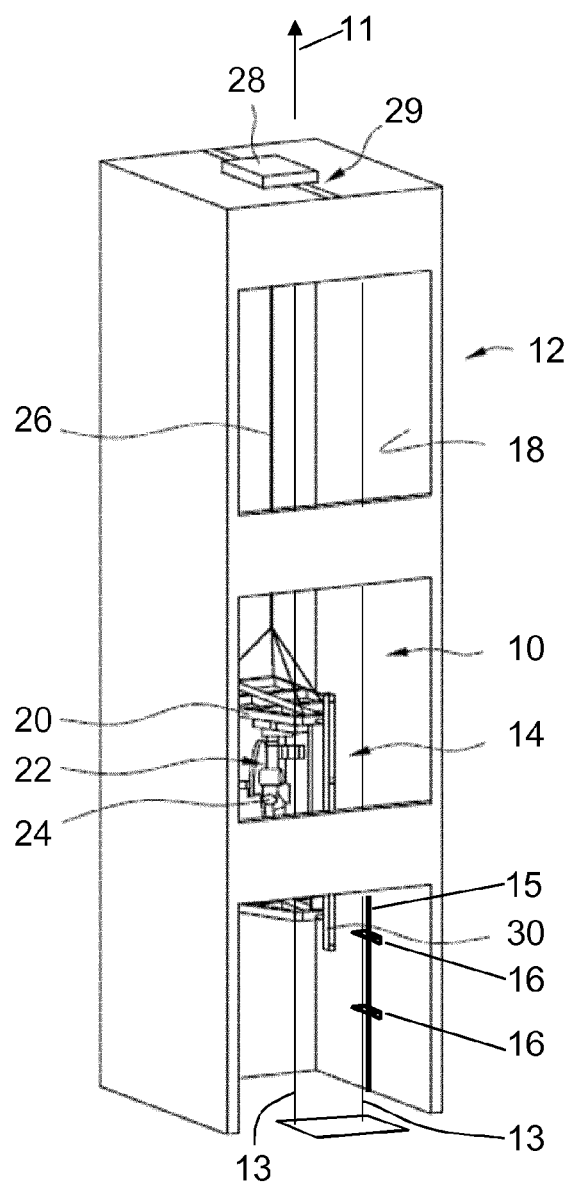
FIG. 1 is a perspective view of an elevator shaft of an elevator system having an assembly device incorporated therein.

FIG. 1 shows an assembly device 14 arranged in an elevator shaft 10 of an elevator system 12 by means of which rail bracket bottom parts 16 can be fixed to a shaft wall 18. The elevator shaft 10 extends in a main extension direction 11, which is vertically aligned in FIG. 1. The guide rails of the elevator system 12, of which one guide rail 15 is shown in FIG. 1, are fixed to the shaft wall 18 via the rail bracket bottom parts 16. The assembly device 14 has a carrier component 20 and a mechatronic installation component 22. The carrier component 20 is designed as a frame on which the mechatronic installation component 22 is assembled. This frame has dimensions that allow the carrier component 20 to be displaced vertically within the elevator shaft 10, i.e. to travel to different vertical positions at different floors within a building, for example. In the example shown, the mechatronic installation component 22 is designed as an industrial robot 24 attached to the frame of the carrier component 20 hanging downwards. One arm of the industrial robot 24 can be moved relative to the carrier component 20 and, for example, displaced to the shaft wall 18 of the elevator shaft 10.

The carrier component 20 is connected to a displacement component 28 in the shape of a motor-driven cable winch via a steel cable serving as carrying means 26, which is attached at the top of the elevator shaft 10 to a stopping place 29 on the ceiling of the elevator shaft 10. By means of the displacement component 28, the assembly device 14 can be displaced within the elevator shaft 10 in the main extension direction 11 of the elevator shaft 10, i.e. vertically over the entire length of the elevator shaft 10.

The assembly device 14 further has a fixing component 30 which can be used to fix the carrier component 20 inside the elevator shaft 10 in a lateral direction, i.e. in a horizontal direction.

In the elevator shaft 10, two reference elements 13 are stretched in the shape of cords along the entire length of the shaft, aligned along the main extension direction 11. The reference elements 13 are attached to the elevator shaft 10 by an assembler and form the reference for the alignment and the assembling of guide rails of the elevator system 12. The guide rails must therefore run parallel to the reference elements 13 in the assembled state and at a certain distance from the reference elements 13.

Figure 2:
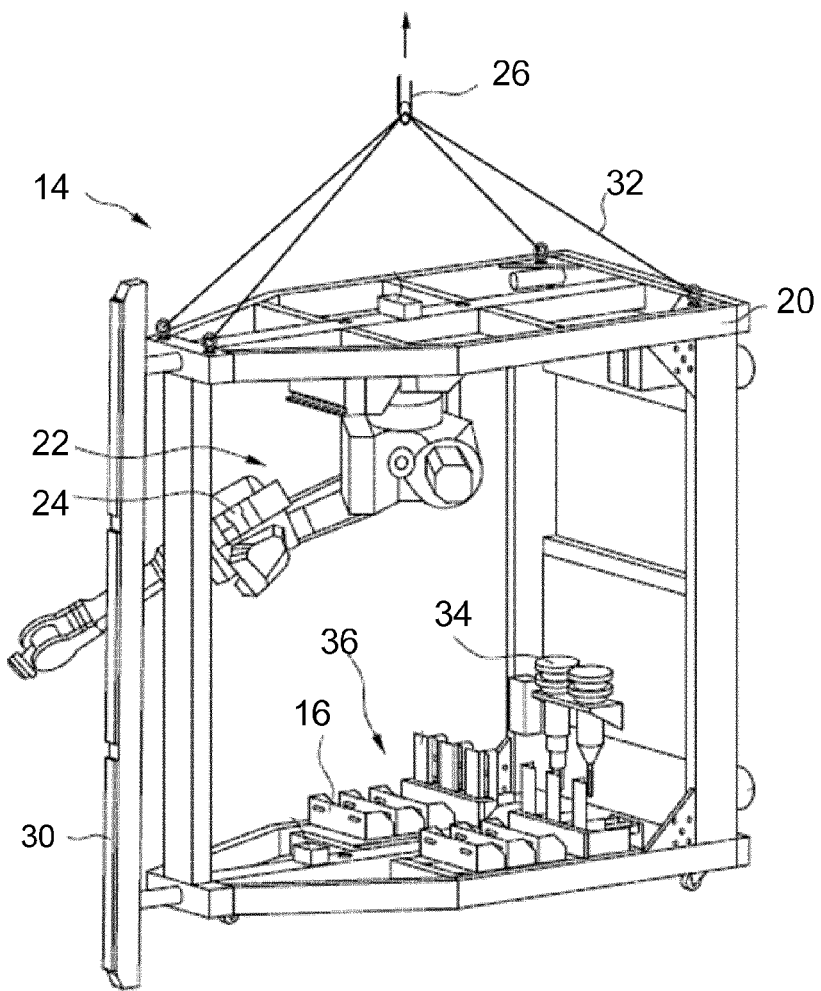
FIG. 2 is a perspective view of an assembly device.

FIG. 2 shows an enlarged view of an assembly device 14.

The carrier component 20 is formed as a cage-like frame, in which a plurality of horizontally and vertically running spars form a mechanically robust structure.

Holding cables 32 are attached to the top of the cage-like carrier component 20, which can be connected to the carrying means 26.

In the embodiment shown, the mechatronic installation component 22 is implemented by means of an industrial robot 24. In the example shown, the industrial robot 24 is equipped with a plurality of robot arms that can pivot around pivot axles. For example, the industrial robot can have at least six degrees of freedom, i.e. an assembly tool 34 guided by the industrial robot 24 can be moved with six degrees of freedom, i.e. for example having three degrees of rotational freedom and three degrees of translational freedom. For example, the industrial robot may be designed as a vertical articulated arm robot, a horizontal articulated arm robot or SCARA robot, or as a Cartesian robot or gantry robot.

At its cantilever end, the robot can be coupled with a variety of assembly tools 34. The assembly tools 34 can differ with regard to their construction and their intended use. The assembly tools 34 can be held on the carrier component 20 in such a way that the cantilever end of the industrial robot 24 can be approached and coupled to one of them. For this purpose, the industrial robot 24 may, for example, have a tool changing system which is formed so that it enables at least the handling of a plurality of such assembly tools 34.

One of the assembly tools 34 is designed as a sensor, for example as a laser scanner, by means of which the relative location of the carrier component 20 relative to the reference elements 13 can be defined. This can be done, for example, by a method described in the patent proprietor's non-publicized European patent application with the application number EP16163399.5. From the relative location of the carrier component 20 in relation to the reference elements 13, the position of the carrier component 20 in the elevator shaft 10 can be determined. On the basis of the position of the carrier component 20, it is possible to define at which points of the shaft wall 18 a rail bracket bottom part 16 is to be secured. These points are referred to here as the intended fixing region (41 in FIG. 4, 43 in FIG. 5).

Figure 3:
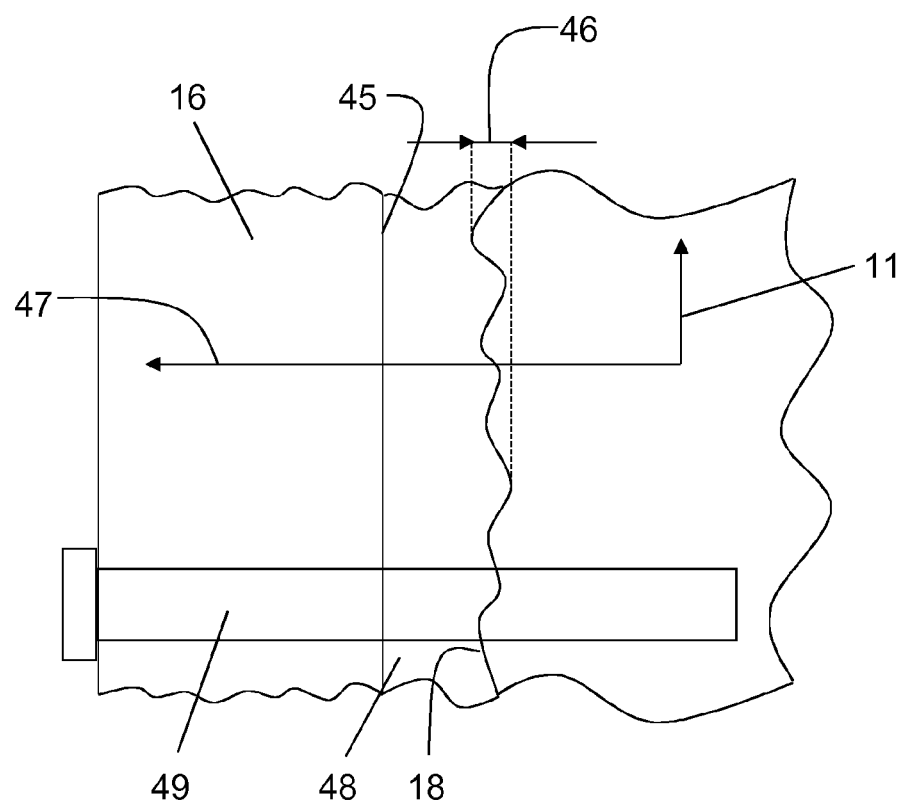
FIG. 3 is a section of a rail bracket fixed to the shaft wall of the elevator shaft in a side view.
Figures 4, 5:
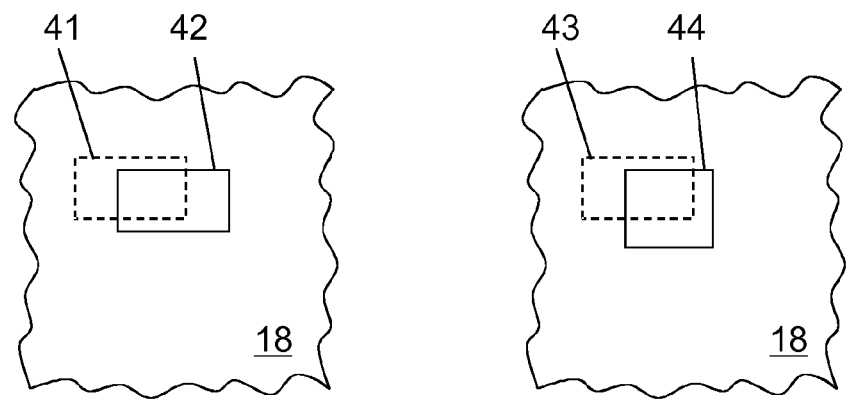
FIG. 4 is a section of a shaft wall of the elevator shaft with a planned and a final fixing region.
FIG. 5 is a section of a shaft wall of the elevator shaft having a planned and a final fixing region in a second example.

The mentioned laser scanner can also be used to check the shaft wall 18, in particular the intended fixing region (41 in FIG. 4, 43 in FIG. 5). During this check, the laser scanner is used to define the contour of the shaft wall 18 vertical to the shaft wall 18 (direction 11 in FIG. 3), i.e. in the horizontal direction. The check of the planned fixing region is described in more detail in connection with FIG. 3.

The position of the carrier component in the elevator shaft can also be defined by means of a digital model of the elevator system. For this purpose, the entire elevator shaft must be measured by means of a laser scanner, for example.

One of the assembly tools 34 is designed as a tool for roughening the shaft wall 18, in particular as a tool having a rotating steel brush or a disc grinder.

One of the assembly tools 34 is designed as a tool for cleaning the shaft wall 18, in particular as a tool for suctioning the shaft wall 18 or for dispensing compressed air.

One of the assembly tools 34 is designed as a tool for applying adhesive to the shaft wall 18 and/or a support surface (45 in FIG. 3) of a rail bracket bottom part 16. The adhesive is designed in particular as a 2-component adhesive based on epoxy resin. For example, such a tool can be designed as a so-called dispenser in which the two components of the adhesive are mixed by means of a so-called mixer during the discharge from storage containers for one of the components each.

One of the assembly tools 34 can be designed as a drilling tool, similar to a drilling machine. By coupling the industrial robot 24 with such a drilling tool, the installation component 22 can be designed to allow at least partially automatically controlled drilling of fixing holes in one of the shaft walls 18 of the elevator shaft 10. The drilling tool can be moved and handled by the industrial robot 24 in such a way that the drilling tool drills holes in the shaft wall 18 of the elevator shaft 10 with a drill in a planned position, into which later fastening elements in the shape of screws or screw anchors are screwed for fixing rail bracket bottom parts.

An additional assembly tool 34 can be designed as a screwdriver to screw screw anchors or screws at least partially automatically into previously drilled fixing holes in the shaft wall 18 of the elevator shaft 10.

An additional assembly tool 34 can be designed as a nailing machine, by means of which nails can be shot through a rail bracket bottom part 16 into the shaft wall 18.

An additional assembly tool 34 is designed as a gripper in order to fix a rail bracket bottom part 16 to the shaft wall 18 at least semi-automatically.

An additional assembly tool 34 can be designed as a drill chisel with which smaller projections on the shaft wall can be removed.

A magazine component 36 may also be provided on the carrier component 20. The magazine component 36 can be used to store the rail bracket bottom parts 16 to be installed and provide them to the installation component 22. The magazine component 36 can also store and provide screw anchors or screws that can be screwed into prefabricated securing holes in the shaft wall 18 by means of the installation component 22.

For fixing a rail bracket bottom part 16 to the shaft wall 18, a target position of the rail bracket bottom part 16 and thereby a planned fixing region (41 in FIG. 4, 43 in FIG. 5) is first defined by a control apparatus which is not shown. The control apparatus knows the position of the carrier component 20 so that the industrial robot 24 can check the planned fixing region (41 in FIG. 4, 43 in FIG. 5) with an assembly tool 34 designed as a scanner. During the check, the contour of the shaft wall 18 in a horizontal direction (47 in FIG. 3) to the course of the shaft wall 18 is checked. A specified test requirement is fulfilled if a maximum difference 46 of the mentioned contour of the shaft wall 18 is smaller than a limit value. It is possible that smaller holes, for example up to a diameter of 3-5 mm, are not considered in the mentioned test. For example, the limit value that the maximum difference 46 may not exceed is 1 to 3 mm.

If the mentioned test requirement is fulfilled, the planned fixing region is taken over as the final fixing region and the rail bracket bottom part 16 is fixed to the shaft wall 18 in the final fixing region.

If the mentioned test requirement is not fulfilled, the rail bracket bottom part 16 cannot be fixed to the shaft wall in the planned fixing region, at least not without additional preparatory work. If the shaft wall 18 has only smaller projections in the planned fixing region, these can be removed with an assembly tool 34 designed as a drill chisel and a new check can then be performed.

If the shaft wall 18 shows larger unevenness, the control apparatus searches for a possible fixing region by slightly shifting the planned fixing region so that the new planned fixing region 42 results in FIG. 4. Subsequently, the described check is performed again. If the test requirement mentioned above is then met, the new planned fixing region is taken over as the final fixing region and the rail bracket bottom part 16 is fixed to the shaft wall 18 in the final fixing region. If the check requirement for the new planned fixing range is not fulfilled again, a new shift is performed.

If one or a plurality of the described shifts of the planned fixing region are not successful, the control apparatus can change the shape of the planned fixing region 43 so that the new planned fixing region 44 in FIG. 5 results. As shown, the new planned fixing region 44 is slightly wider and therefore less high than the originally planned fixing region 43. The possible shapes of the planned fixing regions 44 result from the different embodiments of rail bracket bottom parts 16 available. In the example shown in FIG. 5, the new planned fixing region 44 exceeds the originally planned fixing region 43, so that the new planned fixing region 44 is rechecked. If the test requirement mentioned above is then met, the new planned fixing region is taken over as the final fixing region and the rail bracket bottom part 16 is fixed to the shaft wall 18 in the final fixing region.

If a final fixing region has been found, the planned fixing region is first cleaned with compressed air or vacuumed. Subsequently, the planned fixing region is roughened with an assembly tool 34, which has a rotating wire brush, or an assembly tool 34 designed as an angle grinder. Subsequently, an optional adhesive layer can be applied to the planned fixing region. Thereby, the planned fixing region for fixing the rail bracket bottom part is prepared, so that adhesive is applied to the planned fixing region of the shaft wall 18 and/or the support surface (45 in FIG. 3) of the rail bracket bottom part 16 with an assembly tool 34 designed as a tool for applying adhesive. The thickness of the applied adhesive layer 48 in FIG. 3 depends on the result of the check of the planned fixing region of the shaft wall 18. The greater the maximum difference in the contour of the shaft wall 18, the thicker the adhesive layer applied.

After the adhesive layer 48 has been applied, the rail bracket bottom part 16 is fixed to the final fixing region with an assembly tool 34 designed as a gripper.

To fix the rail bracket bottom part 16 securely to the shaft wall 18 until the adhesive has cured, an additional nail 49 fixing element can be fixed to the shaft wall 18 with an assembly tool 34 designed as a nailing machine. The nail 49 can in particular be shot through the rail bracket bottom part 16 without a prepared hole for this.

To ensure that the rail bracket bottom part remains in its planned position until additional fixing with the nail 49, the assembly tool may have an additional arm by means of which the rail bracket bottom part can be held until the nail is inserted.

Instead of inserting a nail, a screw can also be inserted. In this case, a hole must be drilled in the shaft wall before fixing the rail bracket bottom part. In addition, the rail bracket bottom part must have a suitable hole through which the screw can be guided. Furthermore, additional possibilities for fixing the rail bracket bottom part during curing of the adhesive are conceivable.

When fixing a plurality of rail brackets to the shaft wall, first roughen all final fixing regions in the elevator shaft, then clean all final fixing regions in the elevator shaft and then fix all rail brackets to the shaft walls of the elevator shaft. The roughening and cleaning is in each case performed from top to bottom.

Instead of securing the rail bracket bottom parts at least partially automatically to the shaft walls 18 of the elevator shaft with an assembly device 14 as described, this can also be performed manually by an assembler with the aid of appropriate assembly tools.

Finally, it should be noted that terms such as "have", "comprising", etc. do not exclude any other elements or steps and terms such as "an" or "a" do not exclude any plurality. Further, it should be noted that features or steps described with one of the above embodiment examples can also be used in combination with other features or steps of other embodiment examples described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for fixing a rail bracket for mounting a guide rail on a shaft wall of an elevator shaft of an elevator system comprising the steps of:
   selecting a final fixing region on a surface of the shaft wall;
   applying a curable adhesive layer to at least one of the final fixing region and a support surface of the rail bracket; and
   fixing the rail bracket to the shaft wall with the adhesive layer arranged between the support surface and the final fixing region wherein the rail bracket is adhered to the shaft wall when the adhesive layer has cured.

2. A method for fixing a rail bracket for mounting a guide rail on a shaft wall of an elevator shaft of an elevator system comprising the steps of:
   selecting a final fixing region on a surface of the shaft wall;
   applying a curable adhesive layer to at least one of the final fixing region and a support surface of the rail bracket; and
   fixing the rail bracket to the shaft wall with the curable adhesive layer arranged between the support surface and the final fixing region wherein the curable adhesive layer directly contacts the rail bracket support surface and the shaft wall surface final fixing region and secures the rail bracket to the shaft wall to enable mounting a guide rail at the rail bracket.

3. The method according to claim 2 including checking a planned fixing region on the surface of the shaft wall and selecting the planned fixing region as the final fixing region only if a specified test requirement is fulfilled as a result of the checking.

4. The method according to claim 3 including performing the checking of the planned fixing region by detecting a contour of the planned fixing region along a vertical direction of the shaft wall.

5. The method according to claim 4 where in the specified test requirement is fulfilled if a maximum difference of the contour is smaller than a specified limit value.

6. The method according to claim 3 including selecting a thickness of the curable adhesive layer based on a result of the checking of the planned fixing region.

7. The method according to claim 3 including adjusting at least one of a position and a shape of the planned fixing region if the specified test requirement is not fulfilled to define an adjusted planned fixing region.

8. The method according to claim 7 including checking the adjusted planned fixing region if the adjusted planned fixing region extends beyond the planned fixing region.

9. The method according to claim 2 including pretreating the final fixing region before fixing the rail bracket to the shaft wall.

10. The method according to claim 9 wherein the pretreating includes roughening the final fixing region.

11. The method according to claim 9 wherein the pretreating includes cleaning the final fixing region.

12. The method according to claim 9 including:
   selecting a plurality of the final fixing region on the surface of the shaft wall;
   roughening all of the final fixing regions;
   after the roughening, cleaning all of the final fixing regions; and
   after the cleaning, fixing a plurality of the rail bracket to the shaft wall at the final fixing regions.

13. The method according to claim 2 wherein the fixing includes fixing the rail bracket to the shaft wall with a fixing element.

14. The method according to claim 2 including performing at least one of the steps with a mechatronic installation component.

* * * * *